R. F. BRIGGS.
Carriage Seat.

No. 109,377.    Patented Nov. 22, 1870.

Witnesses
William T. Letteney
J. A. Greely

Inventor
Richard F. Briggs

United States Patent Office.

RICHARD F. BRIGGS, OF AMESBURY, MASSACHUSETTS.

Letters Patent No. 109,377, dated November 22, 1870.

IMPROVEMENT IN SLIDING SEATS FOR CARRIAGES.

The Schedule referred to in these Letters Patent and making part of the same.

*To all whom it may concern:*

Be it known that I, RICHARD F. BRIGGS, of Amesbury, in the county of Essex and State of Massachusetts, have invented a new and useful Improvement on a Slide-Seat for Carriage-Bodies; and I do hereby declare that the following is a full, clear, and exact description of the construction and operation of the same, reference being had to the annexed drawing making a part of this specification, in which—

In the drawing similar letters refer to similar parts.

Figure 1:
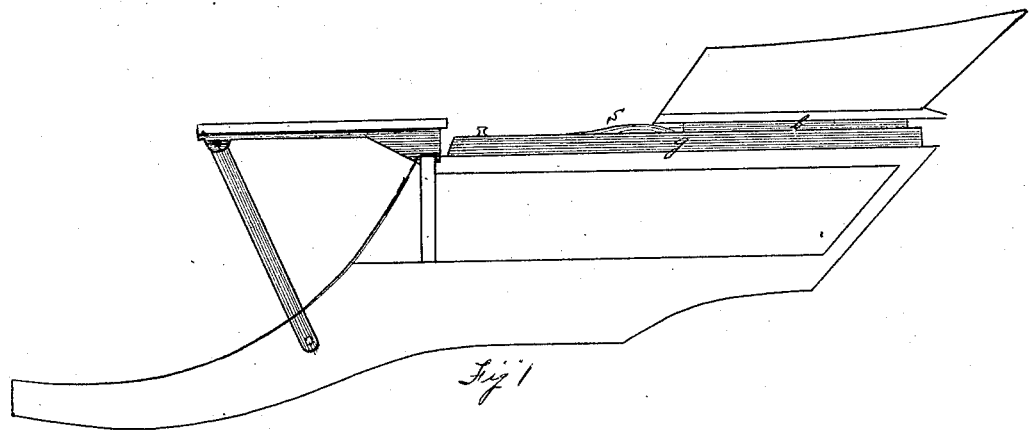
Figure 1 shows a carriage-body arranged with two seats.
Figure 2:
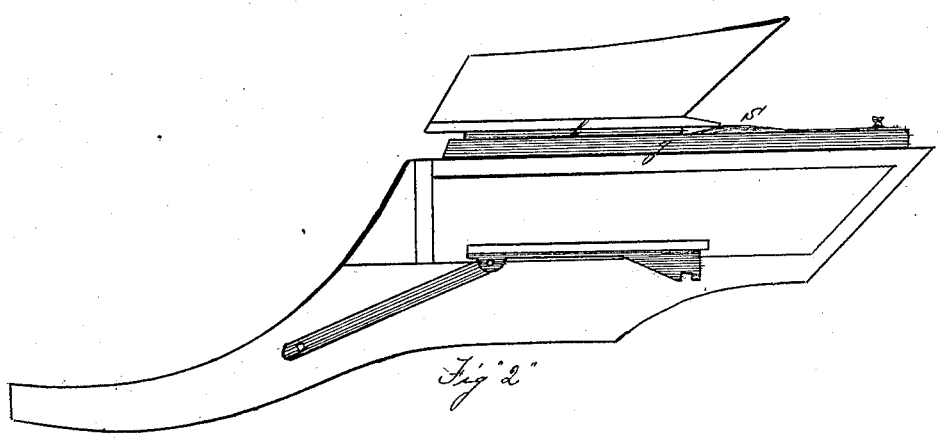
Figure 2 shows a carriage-body arranged with one seat, the front seat being folded back into the body and the back seat slid forward over it.
Figure 3:
Figure 3 shows a sectional view of the iron groove $g$, with the head-blocks $h\ h$, the brass slide $b$, and the spring $s$.
Figure 4:
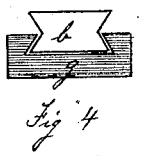
Figure 4 shows an end view of groove $g$ and brass slide $s$.

The construction of this slide seat is as follows:

I take a carriage-body, on which it is required to slide the seat back and forth, and secure thereunto, at each of the top sides thereof, the iron grooves $g\ g$, which extend along the sides of the body the distance the seat is required to slide; said grooves are beveled under on each side of the slot, to receive the corresponding beveled brass slide $b$. Said grooves are provided with head-blocks $h\ h$, for the brass slide $b$ to strike against, and are secured to the body by means of bolts or screws, parallel to each other.

The brass slides $b\ b$ are secured to each end of the seat, on the bottom thereof, parallel to each other, and at the same distance apart as the parallel iron grooves $g\ g$ on the body, in which they slide. Said brass slides are shorter in length than the width of the seat, the seat extending forward, and back of the brass slides $b\ b$ one-fifth more or less of its width.

To secure the seat when back or forward, I use the springs $s\ s$. The width of said springs is the same as the width of the slot in the iron grooves $g\ g$, and the length thereof is equal to the distance between the head-blocks $h\ h$ of the iron groove $g$, less the length of the brass slide $b$.

Said springs are made from spring steel, one-eighth of an inch, more or less, in thickness, and are crowned up and tempered where the seat extends forward over the brass slides $b\ b$.

The crowned part of springs $s\ s$ coming in contact with the bottom of the seat, causes the springs to snap down into the grooves $g\ g$ against the head-blocks $h\ h$, thus securing the seat from sliding forward.

To slide the seat forward, remove the springs $s\ s$, slide the seat forward until it reaches the head-blocks $h\ h$, and insert the springs $s\ s$ in the grooves $g\ g$, back of the seat, thus securing it in its position forward.

This slide seat is designed to be used in connection with a folding front seat, but may be used on any body where it is required to slide the seat back or forth.

I do not claim the ways or grooves $g\ g$ on which the seat slides, except as regards the peculiar construction of them.

What I do claim as my invention, and desire to secure by Letters Patent, is—

1. The construction of the grooves $g\ g$ with each side of the slot or way, beveled under, as described.

2. The application of springs $s\ s$ to grooves $g\ g$ and slides $b\ b$, as described, for the purpose herein set forth.

RICHARD F. BRIGGS.

Witnesses:
GEO. W. CATE,
J. W. BRIGGS.